J. P. Manny,
Harvester Rake.

No. 112,940.  Patented Mar. 21, 1871.

Witnesses:
Wm H. Rowe
Joel Byton

Inventor:
John P. Manny

UNITED STATES PATENT OFFICE.

JOHN P. MANNY, OF ROCKFORD, ILLINOIS.

IMPROVEMENT IN HARVESTER-RAKES.

Specification forming part of Letters Patent No. 112,940, dated March 21, 1871.

*To all whom it may concern:*

Be it known that I, JOHN P. MANNY, of Rockford, in the county of Winnebago and State of Illinois, have invented certain new and useful Improvements in Harvesters and Harvester-Rakes, of which the following is a specification:

The improvements herein claimed relate to the construction of the platform and of the automatic rake.

In the accompanying drawing all of the improvements herein claimed are shown as embodied in a harvesting-machine similar in its general features to that shown and described in sundry Letters Patent of the United States heretofore granted to me, more especially those dated March 25, 1862, and June 15, 1869. It is obvious, however, that some of these improvements may be used without the others, and that they may be adapted to machines of a class or construction differing from that herein shown and described; also, that the details of construction of some of the parts may be varied without departing from the spirit of my invention.

Figure 1:
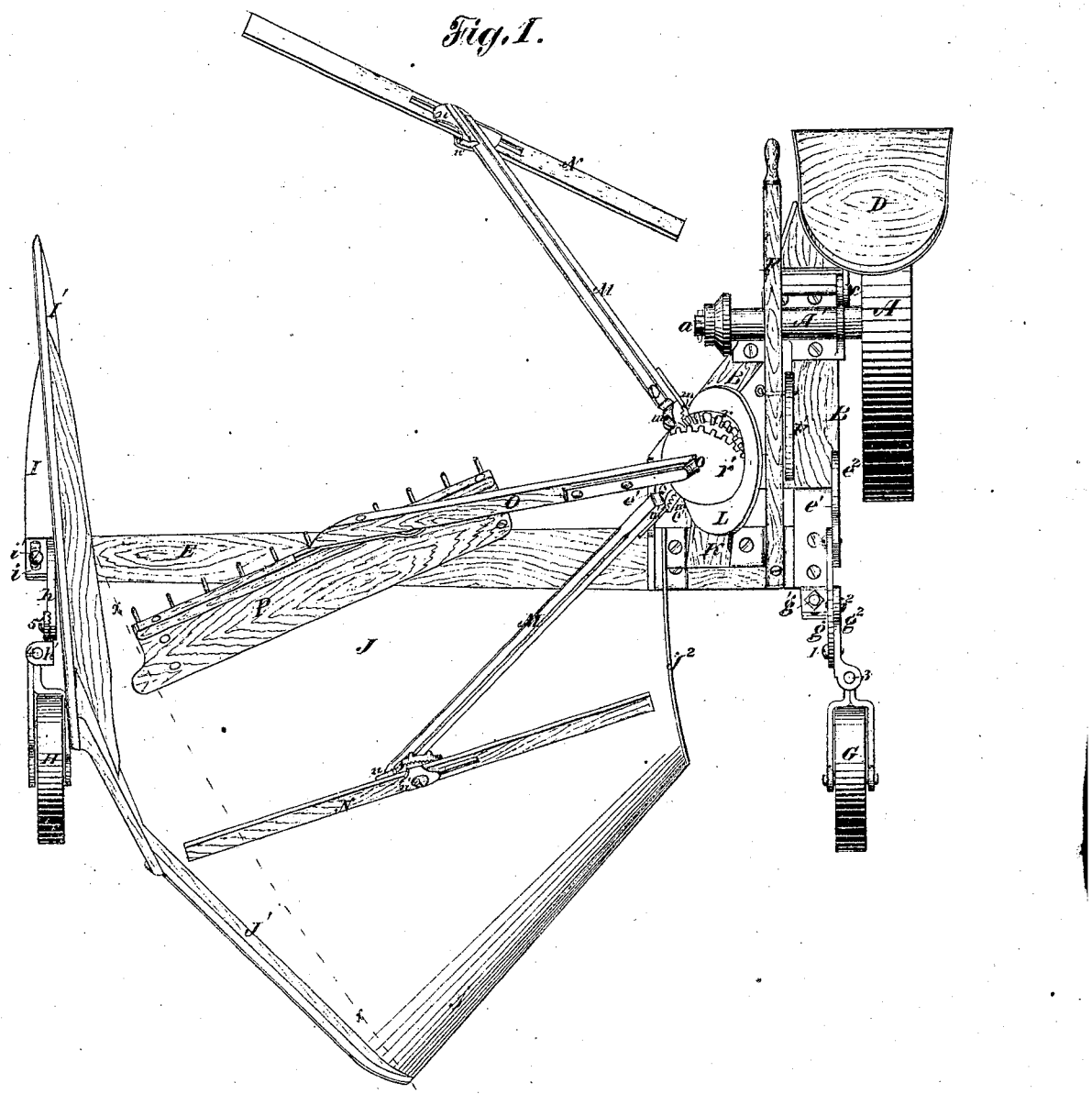
Figure 2:
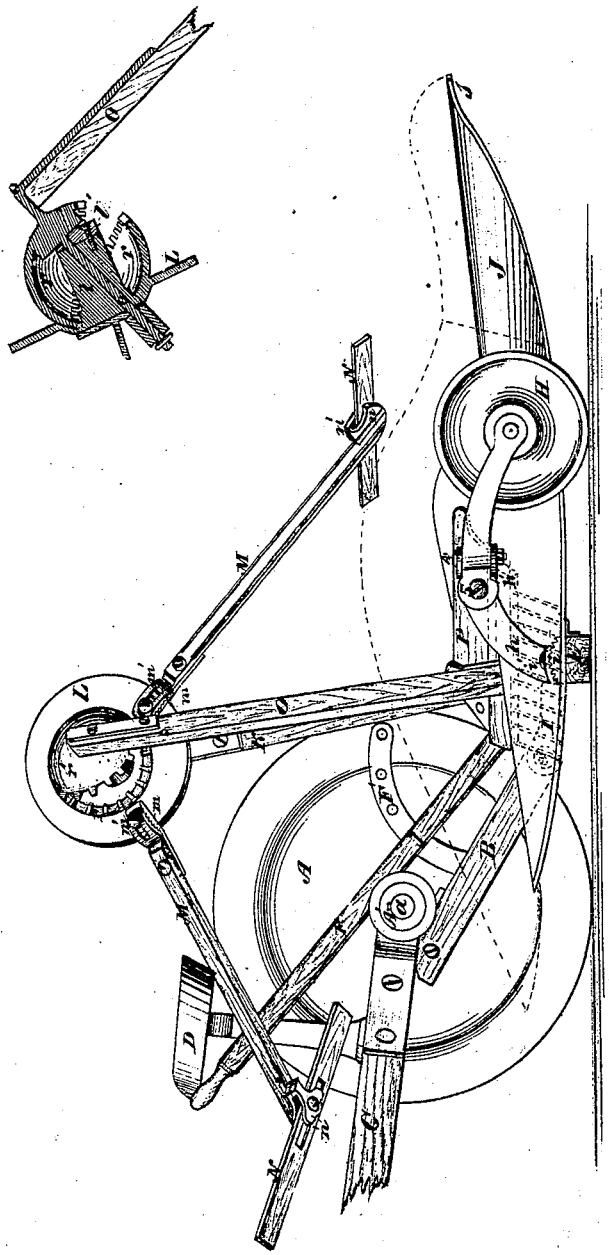
Figure 3:
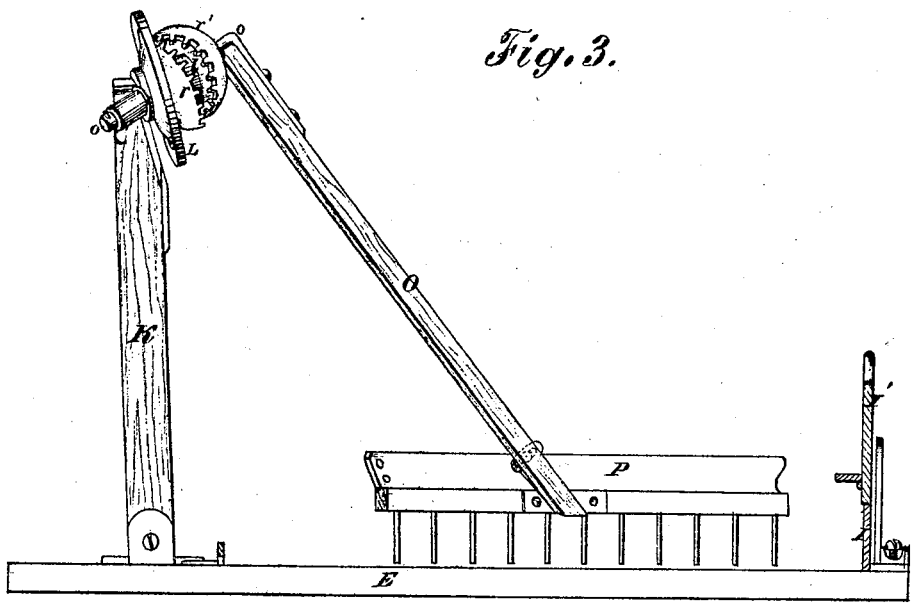

Figure 1 represents a plan view of so much of my improved harvester as is necessary to illustrate the invention herein claimed. Fig. 2 represents an elevation of the same as seen from the divider side of the machine, with the supplementary divider shown in dotted lines. Fig. 3 represents a front elevation of a portion of the machine. Fig. 4 represents a section through the reel-shaft.

As the invention herein claimed relates only to the platform and rakes, it is deemed unnecessary here to describe the details of the other parts of the machine, especially as they are fully shown and described in Letters Patent issued to me simultaneously with these.

I construct the platform J, by preference, in the form of the segment of the frustum of a cone, with its concave sides uppermost and its apex or narrowest part nearest the gear-frame. This platform is provided with the usual guards or fenders, $J^1$ $J^2$, and may be attached to the finger-beam in any suitable well-known way which will admit of its ready removal and replacement. When the finger-beam is level the back of my platform is higher than the front.

I make the back edge of the platform flat and horizontal for a width of about six inches, as at $j$, as I find such construction beneficial in preventing the grain from scattering, to which I have found it liable, especially when working with an automatic rake, and insures a more perfect delivery of the gavel, as hereinafter more fully explained.

I mount a post or standard, K, firmly upon the finger-beam, near its heel end, by preference inclining it slightly forward, so that the axis of the reel shall be slightly in advance of the finger-beam, that the reel may reach well forward into the standing grain.

A stud-axle, $l$, Fig. 4, for the reel, is mounted in proper bearings upon this post. In Figs. 1, 2, and 3 this reel-shaft is shown as inclined upward at an acute angle to the horizon, and also as inclining slightly backward from the finger-beam.

A hub or flanged collar, L, turns freely on the axle $l$, and is held thereon by a cap, $l'$. The reel-arms M are secured to this hub by corrugated semicircular lugs $m$ and sockets $m'$, the latter being provided with slots, through which a set-screw passes to clamp the reel-arms securely to the hub, and to enable them to be adjusted in radial lines to any desired angle to their axis of rotation. Two reel-arms only are shown in the drawing; but four or more are used in practice.

The reel-ribs M are slotted and made movable endwise upon the reel-arms by a set-screw passing through a clamping-plate, $n'$, and through the slot in the reel-rib. The inner faces of the flanged socket $n$ and clamping-plate $n'$ are correspondingly corrugated to prevent the beater from turning. It will thus be seen that the reel-arm and beater are securely clamped by a single screw. I have found this device practically of great utility, as it is essential that the reel ribs and arms should be adjustable, as the loosening of the joints connecting these parts often causes the breakage of the machine.

The rake is shown in Figs. 1, 2, and 3 as mounted on a shaft, o, passing through the stud-axle l of the reel at an acute angle thereto, and inclined at an angle, say, of twenty-five degrees to the horizon, and also inclined backward relatively to the finger-beam at an angle of about ten degrees. These degrees of inclination may, however, be varied in order to adapt the rake to platforms on machines of different forms or construction.

The rake-arm O is attached to its shaft o at nearly a right angle thereto.

The rake-head P is secured to the lower end of this arm by an adjustable connection, by which the rake is kept parallel with the finger-beam horizontally.

A gear-wheel, r, is mounted on and turns with the flanged collar L. This wheel is arranged eccentrically to said collar, and also inclined relatively thereto, as shown in Figs. 1, 2, 3, 4.

A similar gear-wheel, r', is similarly arranged on the rake-shaft o, but with its longer side matching the shorter side of the other gear. Both gears have an equal number of teeth, and revolve on a center coincident with the point of intersection of the axes of the stud l and rake-shaft o. The consequence of this arrangement is, that while the reel revolves at a uniform speed the rake sometimes moves more rapidly and sometimes more slowly than the reel, but always makes the same number of revolutions as the reel, and the two gears always work harmoniously without binding or straining.

The operation of the machine is as follows: The flanged hub L revolves at a uniform speed. The reel-beaters press the grain back upon the platform in the usual way. The rake always runs between the same two beaters. Owing to the angle of inclination of the rake-shaft o and its eccentricity to the reel-axis, the rake, in descending upon the finger-beam, moves in a path very nearly coincident with that of the reel ribs or beaters.

The rake, it will be observed, is much shorter than the width of cut, it not being necessary that it should gather the grain to the cutters. Owing to its peculiar construction the rake descends upon the platform at an acute angle thereto, with its end nearest the divider in advance, as seen in Fig. 1, and sweeps across the platform in a curve of the form of a very flat ellipse, as shown by the line x of Fig. 1, diverging at the same time from the path of the reel-ribs, and sweeping the grain off the rear end of the platform. The rake, it will be noticed, moves across the platform diagonally, gradually drawing the grain from the divider toward the stubble side of the machine, and sweeping the platform clean.

One consequence of my improvement is, that I am enabled to sweep a platform five feet in width with a rake only three feet in length.

This shearing action of the rake enables me to move a bundle with comparatively little strain, as the force is applied gradually to the gavel instead of all at once, as usual.

The arrangement of the gearing causes the rake to move more slowly than the reel in going over the platform, to prevent flirting off and scattering the grain, while the backward inclination of the rake-shaft gives a more extended sweep backward in discharging the gavel than would be the case were the rake-shaft parallel with the finger-beam. In moving forward to re-enter the standing grain the rake moves more rapidly than the reel, and thus regains the distance lost in raking off.

The upward and backward inclination of the rake-shaft not only imparts a diagonal lifting movement to the rake, of great utility in discharging the gavel, but also gives a much larger sweep to the rake than could be obtained were its axis horizontal.

By using a concave curved platform of the form shown I am enabled to adapt it to the movements of the rake, and thus avoid the use of cam-guides and much complicated mechanism.

When the machine was going before the wind I have sometimes been troubled by the sheaf being turned over by it, as its rear end is considerably higher than the front in passing over the back of the platform. By making a horizontal ledge of about six inches at the back of the platform I have been enabled to hold the heads up sufficiently until the butts were swept clear of the platform by the rake, and thus secure perfect gavels. This ledge also prevents the heads of green or heavy grain from tipping over and striking the ground before it is shoved off by the rake.

I claim as my invention—

1. The platform constructed, as described, in the form of the segment of the frustum of a cone, with its concave side uppermost, and having a horizontal ledge on its rear edge, for the purpose set forth.

2. The combination of the inclined reel-shaft with the inclined rake-shaft, passing through the reel hub or shaft at an angle acute to its axis of rotation, these parts being constructed to operate in combination, substantially as hereinbefore set forth.

3. The combination of the inclined reel-hub and its eccentric gear with the rake-shaft and its eccentric gear, meshing into that of the reel-hub, these parts being constructed to operate in combination, substantially as hereinbefore set forth, to produce a differential movement of the reel and rake.

4. The combination of the flanged reel-hub, the reel-arms, and the corrugated lugs *m* and sockets *m'*, these parts being constructed as set forth, to permit the radial adjustment of the reel-arms.

5. The combination of the reel-arm, the slotted beater, the flanged and corrugated plate *n*, the corrugated cap *n'*, and the clamp-screw, all constructed for joint operation, as set forth.

In testimony whereof I have hereunto subscribed my name.

JOHN P. MANNY.

Witnesses:
JOE I. PEYTON,
BALTIS DE LONG.